Figure 1:
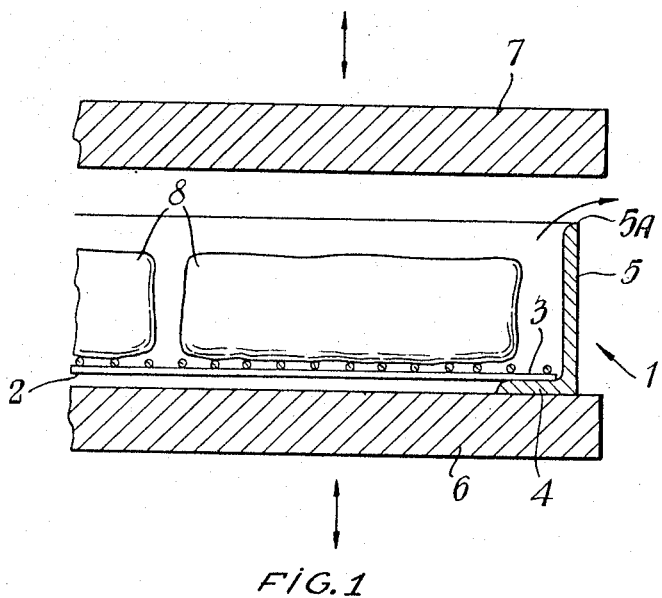

May 9, 1967

H. P. THOMPSON 3,318,012

METHODS OF FREEZE-DRYING MATERIAL, PARTICULARLY
FOODSTUFF MATERIAL

Filed May 17, 1965

2 Sheets-Sheet 1

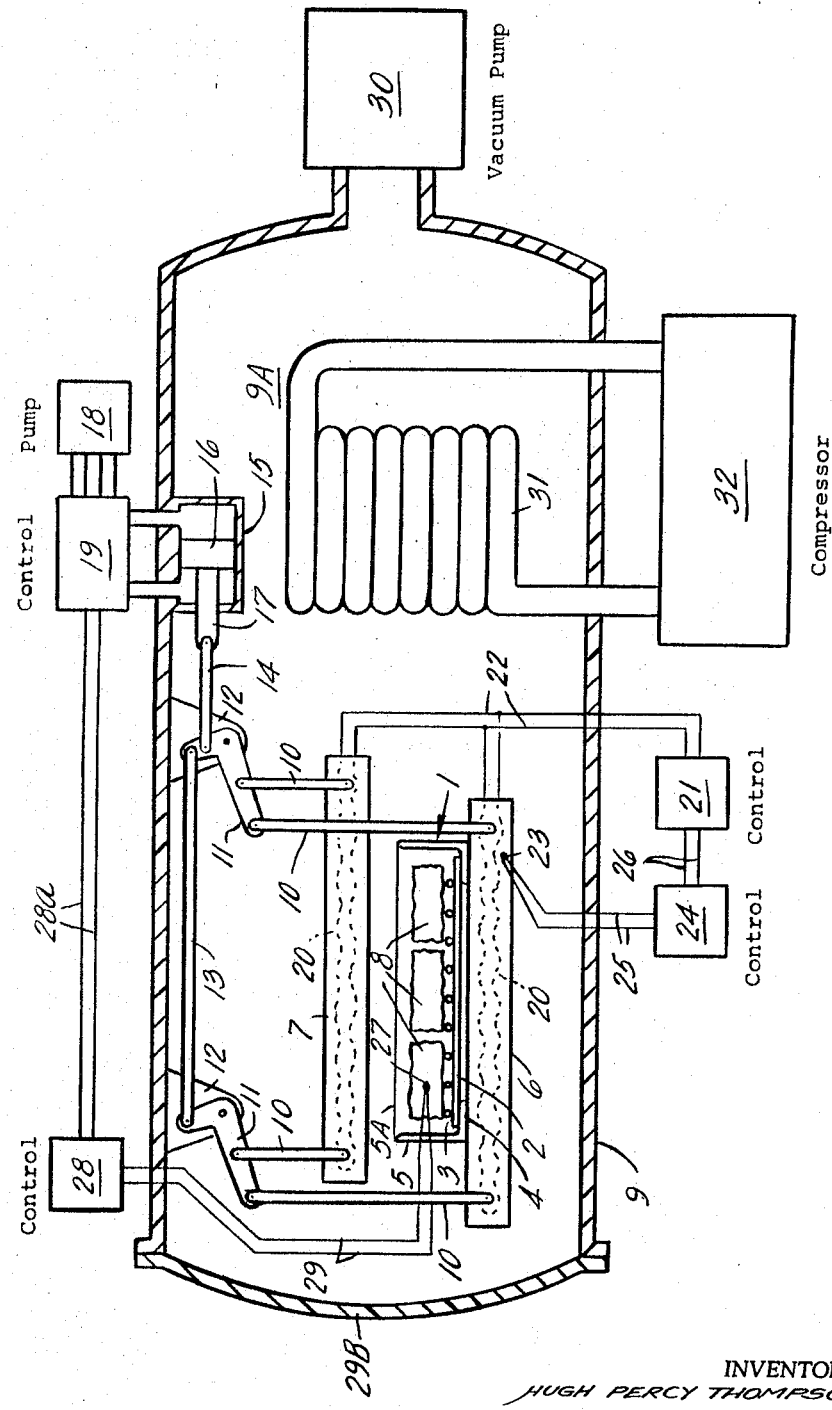

United States Patent Office 3,318,012
Patented May 9, 1967

3,318,012
METHODS OF FREEZE-DRYING MATERIAL, PARTICULARLY FOODSTUFF MATERIAL
Hugh Percy Thompson, Swindon, England, assignor to Vickers Limited, Millbank, London, England, a British company
Filed May 17, 1965, Ser. No. 456,448
Claims priority, application Great Britain, May 19, 1964, 20,691/64
8 Claims. (Cl. 34—5)

This invention is concerned with a method of freeze-drying material, and is more particularly, although not exclusively, concerned with a method of freeze-drying foodstuff material.

According to the present invention there is provided a method of freeze-drying material, including the steps of placing in a container frozen material to be dried, subjecting the frozen material to vacuum, supplying heat to the material in the container while maintaining the material under vacuum to effect drying of the material in a manner such that the water contained in the material is drawn off directly from the ice state to the water vapour state, and adjusting the extent to which the flow of this water vapour from the container is throttled thereby to vary the thermal conductivity of the water vapour.

For a better understanding of the invention and to show how the same may be carried into effect, reference will now be made, by way of example, to the accompanying drawings forming a part of this application and in which:

FIG. 1 is a diagrammatic sectional broken side view of part of an apparatus for freeze-drying material, and FIG. 2 is a diagrammatic longitudinal sectional view of a vacuum-tight chamber and associated elements including those shown in FIG. 1 is a diagrammatic sectional side view of part of an apparatus for freeze-drying material.

The drying apparatus shown in the drawings includes a container in the form of a tray 1 having a rectangular base 2 formed by a fine mesh of expanded or perforated metal, or a wire mesh. The edges 3 of the mesh base 2 are secured to bent-inward bases 4 of rigid upstanding imperforate flanges 5 which form the sides of the tray 1, all four flanges 5 being of the same height. The bases 4 of all four flanges 5 rest on a lower heater plate 6 mounted in a vacuum-tight chamber, such as the chamber 9 shown in FIG. 2. An upper heater plate 7 also mounted in the chamber is disposed above the tray 1. The upper edges 5A of the flanges 5 of the tray 1 terminate beneath the upper heater plate 7 and this plate 7 extends beyond all these edges 5A. The heater plates 6, 7 are mounted on movable supports such as the links 10 in FIG. 2, and linkages, to which the links 10 are shown to be connected as in FIG. 2, are provided for moving the plates 6, 7 in the up and down direction, that is the plates 6, 7 can be moved towards and away from one another so that the width of the gap between the upper edges of the flanges 5A and the lower surface of the upper heater plate 7 can be varied. The plates 6, 7 are electrically heated, there being electrical heating elements 20 in FIG. 2, embedded in the plates. In an alternative construction, the plates are of a hollow labyrinthed construction and are heated by circulating fluid therethrough.

The vacuum-tight chamber is connected, via a vacuum-tight compartment 9A, to a vacuum pump 30. The compartment contains condenser plates 31 which are thus disposed between the tray 1 and the vacuum pump. The chamber 9, as shown in FIG. 2 is provided with a door 9B through which the tray 1 can be passed into and removed from the chamber. The chamber and the door are adapted so that there is a vacuum-tight seal between the chamber and the door when the door is shut. The apparatus is provided with measuring devices, for example thermocouples, such as the thermocouple 27 indicated in FIG. 2, for measuring the temperature of the material being dried.

FIG. 2, illustrates more completely, in a diagrammatic manner the apparatus described above. In this view, the reference numerals 1 through 8 correspond to the numerals used in FIG. 1 and refer to the same or corresponding parts of the apparatus.

In FIG. 2 the heater plates 6, 7 are disposed in a vacuum-tight chamber 9, each supported by a pair of links 10, respectively pivotally connected to the ends of the plate. The two rods 10 supporting adjacent ends of the plates 6, 7 are pivotally connected to one or the other of a pair of spaced ball-crank levers 11, as shown, which levers are respectively pivotally mounted on spaced supports 12 within the chamber 9.

The heater plates 6, 7 hang freely in spaced relation from the lower arms of the ball crank levers 11 with the tray 1 resting on the plate 6 as in FIG. 1. The upwardly-extending arms of levers 11 are interconnected by a link 13 and the arm of one lever 11 is also connected, by a link 14 to the piston rod 17 of a double-acting hydraulic cylinder and piston assembly 15 having a piston 16 to which piston rod 17 is connected. The assembly 15 is connected to a hydraulic fluid pump 18 via a hydraulic fluid flow control unit 19.

The heater plates 6, 7 are thus mounted on the movable supports formed by the links 10 for movement, by the linkages made up of the parts 11, 13, 14 and 17, in the up and down direction, that is, the plates 6, 7 are movable towards and away from one another by assembly 15 so that the width of the gap between the upper edges of the flanges 5A and the lower surface of the upper heater plate 7 can be varied, to in turn vary the throttling of the vapor flow from the container 1. The plates 6, 7 are electrically heated, for example by electrical heating elements 20 embedded in the plates.

The heating elements 20 are connected to a heater control unit 21 by leads 22. A thermocouple 23 is attached to the heater plate 6 and is connected to a temperature control unit 24 by leads 25. The supply of current to the heating elements 20 is controlled by the heater control unit 21 in response to signals from the temperature control unit 24, via leads 26.

A thermocouple 27 is located on or in the frozen material 8 to be dried and is connected to a second temperature control unit 28 via leads 29 which pass through a small aperture in the flange 5 of the tray 1. The second temperature control unit 28 is connected by leads 28a to the hydraulic fluid control unit 19, so that the pump 18 and assembly 15 are operated to vary the throttling of the flow of vapor from the tray 1, and its thermal conductivity, in accordance with the temperature of the material 8, and the signals from the thermocouple 27 and the second temperature control unit 28.

The vacuum-tight chamber 9 is connected, via a vacuum-tight compartment 9A, to a vacuum pump 30. The compartment 9A contains condenser plates 31 which are thus disposed between the tray 1 and the vacuum pump 30. The plates 31 are connected to a refrigerant compressor 32.

In operation of the apparatus the tray 1 is removed from the vacuum chamber and frozen material 8 to be freeze-dried, for example a frozen foodstuff such as a frozen leafy vegetable, is placed in the tray 1, the amount of material 8 placed therein being such that the upper edges 5A of the flanges 5 of the tray 1 are above the upper surface of the material 8. The tray 1 is then placed in the chamber 9, the heater plates 6, 7 set so that the gap between the upper edges 5A of the flanges 5 and the lower surface of the upper heater plate 7 is of a desired width, the door 9B closed, and the vacuum pump 30 set in operation to evacuate the chamber to a very low pressure (e.g. 1 torr or below). This results in the temperature of the frozen material 8 dropping well below the freezing point of the material 8. When a desired minimum temperature of the material 8 has been reached, this being measured by the temperature measuring devices 27, 28, the low pressure in the chamber is maintained and the heater plates 6, 7 are heated to a desired temperature. The heater plates 6, 7 radiate heat on to the material 8 in the tray 1, heat from the lower heater plate 6 passing through the mesh base 2 of the tray 1, and sublimation takes place, the water present in the material 8 being driven off directly from the ice state to the water vapour state without passing through the liquid phase. This water vapour passes into the previously mentioned vacuum-tight compartment 9A to condense to ice on the condenser plates 31 that are in this vacuum-tight compartment. The water vapour passes only through the gap between the upper edges 5A of the imperforate flanges 5 and the lower surface of the upper heater plate 7, the mesh base 2 being closed by the lower heater plate 6. In addition to the radiant heat received by the material 8 being dried, the water vapour surrounding the material 8 acts as a heat transfer medium transferring heat from the heater plates 6, 7, to the material 8, the thermal conductivity of the water vapour surrounding the material 8 being dependent on the vapour pressure within the tray 1.

As drying proceeds, the ice surface of the frozen material 8 recedes and a dry layer of material is formed around the still frozen material. This dry layer, which gradually increases in thickness, is of poor thermal conductivity and it will be appreciated that the resistance offered by the dry layer to the transfer of heat to the still frozen material by conduction through the dry layer of material increases as the dry layer becomes thicker. To offset the effect, on drying, of this increasing resistance, the heater plates 6, 7 are moved to reduce the width of the gap between the flanges 5A and the upper heater plate 7, thereby throttling the flow of water vapour through this gap which has the effect that the vapour pressure within the tray increases whereby the thermal conductivity of the water vapour surrounding the material being dried also increases.

The thermal conductivity of the water vapour in the container may be varied by adjusting the extent to which the flow of water vapour from the container is throttled. The temperature of the material being dried in the container is measured, and the heating of the material and the throttling effect on the vapour are varied in accordance with these temperature measurements, thereby to control the temperature and heating of the material in the container.

When the heater plates 6 and 7 are operated in the manner described above for reducing the width of the gap between the flanges 5A and the upper heater plate 7, the heater plate 7 is moved close to the material 8 being dried. During the drying operation the temperature of the material 8 being dried, as measured by the temperature measuring devices comprising the thermocouple 27 and the control 28, is controlled as desired by moving the heater plates 6, 7 to vary the vapour pressure within the tray 1 and consequently to vary the thermal conductivity of the water vapour surrounding the material 8 being dried, and also if necessary by varying the temperature of the heater plates 6, 7. Since the material 8 in the tray 1 is below the upper edges 5A of the tray flanges 5, the upper heater plate 7 does not come into contact with the material 8 during the movement of the heater plates 6, 7.

The tray 1 has been described as having imperforate flanges 5. In modified forms of tray the flanges are perforated or their upper edges are cut away. In apparatus utilizing any of these forms of tray, the upper heater plate can be brought into direct contact with the tray, vapour escaping from the tray via the perforations in the flanges or via the cut away parts of the flanges.

For materials such as powders a tray with an imperforate base is utilized. In modified forms of apparatus the single tray and two heater plates are replaced by a stack, or stacks, of horizontally disposed equally spaced apart movable heater plates, and a plurality of trays is provided.

The measuring devices, such as the temperature-responsive and control devices 27, 28, 18, and 19 together with the linkages which they control, as illustrated in FIG. 2, can be arranged automatically to control the temperature and movement of the heater plates in dependence upon the measured temperature of the material being dried. In alternative forms of apparatus, the measuring devices are omitted and the temperatures and movements of the heater plates during drying of a particular material are controlled according to a preset programme selected for that particular material, whereby the temperature of the material is controlled in a predetermined desired manner.

I claim:

1. In a method of freeze-drying frozen material containing water in which the water content of the material to be dried is removed and drawn off as ice directly from the ice state to the water vapor state, while the material is located in a container in a vacuum chamber and therein subjected to vacuum conditions and heated by a heater positioned adjacent to the material in the container, the improvement comprising throttling the flow of the water vapor from the container by moving the heater and the container relative to each other, and varying the thermal conductivity of the water vapor in the container by adjusting the extent to which the vapors flowing from the container are throttled.

2. The method as claimed in claim 1, including the step of passing the water vapor flowing from the container through a gap between the upper edge of the container and the heater, and effecting the adjustment of the throttling of the flow through said gap by said relative movement of the heater and container.

3. The method as claimed in claim 2, wherein the relative movement of the heater and container until the heater engages the upper edge of the container above the frozen material therein is insufficient to completely stop the flow of water vapor from the container.

4. The method as claimed in claim 1, including the step of heating the material in the container both from above and below the container.

5. The method as claimed in claim 4, wherein the heating is effected by applying radiant heat to the material in the container.

6. The method as claimed in claim 1, including the step of controlling the extent of the throttling of the flow of vapors from the container in response to variations in the temperature of the material being dried in the container.

7. In a freeze-drying apparatus of the type in which frozen material to be dried is located in a container in a vacuum chamber and therein subjected to vacuum conditions and heated by a heater positioned adjacent to the container, the improvement in which the container is in the form of a tray having upwardly extending peripheral flanges within which the material to be dried is located, a heater plate extending over the tray and providing a gap between it and the upper edges of the flanges for the flow of water vapor from the tray, said heater plate and tray being movable toward and away from each other to vary the width of said gap to effect throttling of the flow of vapors from the tray.

8. The apparatus as claimed in claim 7, wherein the tray includes a base of mesh for supporting the material to be dried and through which heat may be supplied by radiation to said material in the tray.

References Cited by the Examiner

UNITED STATES PATENTS

| | | | |
|---|---|---|---|
| 1,418,638 | 6/1922 | Frankel et al. | 34—92 |
| 2,994,132 | 8/1961 | Neumann | 34—5 |
| 3,077,036 | 2/1963 | Neumann | 34—5 |
| 3,118,742 | 1/1964 | Dalgeish | 34—92 |
| 3,169,049 | 2/1965 | Rey | 34—5 |
| 3,199,217 | 8/1965 | Oldenkamp | 34—5 |

WILLIAM J. WYE, *Primary Examiner.*